(12) United States Patent
Kim

(10) Patent No.: US 7,126,646 B2
(45) Date of Patent: Oct. 24, 2006

(54) DEVICE AND METHOD FOR TRACKING PHASE ERROR IN DIGITAL TV RECEIVER

(75) Inventor: Woo Chan Kim, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 477 days.

(21) Appl. No.: 10/745,659

(22) Filed: Dec. 29, 2003

(65) Prior Publication Data

US 2004/0135928 A1 Jul. 15, 2004

(30) Foreign Application Priority Data

Dec. 28, 2002 (KR) ...................... 10-2002-0085810

(51) Int. Cl.
| | |
|---|---|
| H04N 5/21 | (2006.01) |
| H04N 5/44 | (2006.01) |
| H04N 5/455 | (2006.01) |
| H04N 5/213 | (2006.01) |
| H04N 5/217 | (2006.01) |
| H04N 9/65 | (2006.01) |
| H04N 7/12 | (2006.01) |
| H04N 11/02 | (2006.01) |
| H04N 11/04 | (2006.01) |
| H04B 1/66 | (2006.01) |
| H04B 3/46 | (2006.01) |
| H04B 17/00 | (2006.01) |
| H03D 1/24 | (2006.01) |
| H04L 7/00 | (2006.01) |
| H04L 7/04 | (2006.01) |
| H04L 25/00 | (2006.01) |
| H04L 25/40 | (2006.01) |

(52) U.S. Cl. ...................... 348/726; 348/607; 348/614; 348/720; 348/725; 348/727; 375/240.27; 375/240.28; 375/226; 375/321; 375/362; 375/371

(58) Field of Classification Search ................ 348/466, 348/607, 720, 725–727; 375/240.27, 240.28, 375/226, 321, 362, 371

See application file for complete search history.

(56) References Cited

U.S. PATENT DOCUMENTS

| | | | | |
|---|---|---|---|---|
| 6,275,990 | B1 * | 8/2001 | Dapper et al. | 725/106 |
| 6,298,100 | B1 * | 10/2001 | Bouillet | 375/326 |
| 6,707,861 | B1 * | 3/2004 | Stewart | 375/321 |
| 6,829,298 | B1 * | 12/2004 | Abe et al. | 375/233 |
| 2004/0096023 | A1 * | 5/2004 | Bourdeau | 375/362 |
| 2004/0100587 | A1 * | 5/2004 | Kim | 348/607 |
| 2004/0125235 | A1 * | 7/2004 | Kim et al. | 348/607 |
| 2004/0150754 | A1 * | 8/2004 | Jun | 348/607 |

* cited by examiner

Primary Examiner—Brian P. Yenke
(74) Attorney, Agent, or Firm—Birch, Stewart, Kolasch & Birch, LLP

(57) ABSTRACT

Device and method for tracking a phase error in a digital TV receiver, wherein a phase noise compensated I signal is subtracted from I level reference signals of VSB signal, to obtain an error of the I signal, a sign of the Q signal having a phase noise thereof compensated is multiplied to the error of the I signal from the error determining part, to estimate a basic phase error, and a phase error compensating area is determined, a preset constant 'α' is multiplied to the basic phase error to provide a final phase error in the determined phase error compensating area, and the basic phase error is provided as it is as the final phase error in other areas, thereby estimating the phase error more accurately.

15 Claims, 9 Drawing Sheets

DEVICE AND METHOD FOR TRACKING PHASE ERROR IN DIGITAL TV RECEIVER

This application claims the benefit of the Korean Application No. P2002-85810 filed on Dec. 28, 2002, which is hereby incorporated by reference.

BACKGROUND OF THE INVENTION

1. Field of the Invention

The present invention relates to digital TV (DTV) receivers, and more particularly, to device and method for tracking a phase error in a digital TV receiver, for receiving a signal modulated in a VSB system, and removing a phase noise therefrom.

2. Background of the Related Art

Digital TV receivers in most of digital transmission systems used currently, and digital TV receivers for receiving an ATSC (Advanced Television Systems Committee) 8VSB signal suggested as a DTV transmission system for the USA uses tuners inevitably when a broadcasting signal is transmitted through the air, or a line.

FIG. 1 illustrates a block diagram of a related art DTV receiver, wherein, when a RF signal modulated in a VSB system is received through an antenna, the tuner 101 selects a desired channel frequency, converts into an IF signal, and provides to a demodulating part 102. The demodulating part 102 digitizes the IF signal, has a phase separated therefrom, and recovers a carrier, to convert the IF signal into I, and Q component base band signals, which I component base band signal is provided to a timing restoring part 106. That is, since the I component signal includes a signal distortion at the channel and the tuner, an equalizing part 103 is used for compensating the signal distortion.

The equalizing part 103 removes a linear distortion of an amplitude that causes an interference between symbols, and a ghost produced as the signal is reflected at buildings and mountains from the I component signal, and provides the I component signal to an error tracking loop 104. After compensating for the phase noise, and the like remained in the channel equalized signal, the error tracking loop 104 provides a compensated data to a slicing part 105. The slicing part 105 slices the data having the phase error tracked at a preset slice level, to restore a signal transmitted originally.

A synchronism detection and timing restoring part 106 restores a field synchronizing signal, a segment synchronizing signal, and the like from the base band I signal from the demodulating part 102 inserted therein at the time of transmission, and generates a symbol clock identical to one used at the time of transmission by using the synchronizing signals, and the base band I signal. This is because, in the ATSC 8VSB transmission system suggested for a USA digital TV system, no symbol clock is transmitted, but only data are transmitted. The synchronizing signals detected at the synchronism detection and timing restoring part 106 are provided to the equalizing part 103, and the symbol clock proportional to a timing error of the present symbol is provided to the demodulating part 102 for A/D conversion.

In the digital TV receiver, a frequency generator in the tuner 101 fails in generating a constant frequency, to generate a frequency varied with performance. One of noises caused by the frequency variation is the phase noise. Moreover, there are a small DC offset, and a gain error mixed in a signal passed through the demodulating part 102 and the equalizing part 103 that compensates for a channel distortion. The phase error implies that a signal is deviated from an original signal with a fixed phase error, but the phase error varies irregularly. In general, the phase noise has a size below approx. 60°, and 90° at the maximum.

A part that corrects the phase noise, the DC offset, and the gain error is the error tracking loop 104.

That is, though the equalizing part 103 compensates for the channel distortion, the gain error, and the like, the equalizing part 103 can not compensate for noises and errors that vary quickly properly because a base band of a loop that renews an equalizing coefficient is narrow. Particularly, since the phase noise generated at the tuner 101 varies quickly, the equalizing part 103 can not compensate for the phase error, adequately. The DC offset, and the gain error having the equalizing part 103 failed to compensate for are also mixed in the equalized signal.

Therefore, the error tracking loop 104 corrects the phase noise, the DC offset, and the gain error.

FIG. 2 illustrates a block diagram of a related art error tracking loop 104, wherein it can be noted that a signal passed through the equalizing part 103 has I component data, only. However, for compensating for the phase noise, both the I data and the Q data are required.

A multiplier 201 multiplies a gain error compensating signal passed through a gain loop filter 211 and a limiter 212 in succession and the I component signal from the equalizing part 103, to compensate for the gain error of the I signal, and provides to a delay 202, and a Hilbert Transform FIR filter (Hilbert Transform Finite Inpulse Response Filter) 203. The Hilbert Transform FIR filter 203 receives, and inverts the I component signal at 90°, and provides to a complex multiplier 205. An I signal inverted at 90° at the Hilbert Transform FIR filter is in general called as a Q signal. The delay 202 receives, and delays the I signal as much as a time period required for processing at the Hilbert Transform FIR filter 203, i.e., equal to a number of taps of the Hilbert Transform FIR filter 203, and provides to an adder 204. The adder 204 adds the delayed I signal and the DC offset compensated signal passed through a DC offset loop filter 209, and a limiter 210 in succession, to compensate the I signal for the DC offset, and provides to the complex multiplier 205.

The complex multiplier 205 makes complex multiplication of a sine wave and a cosine wave obtained through a phase loop filter 208 and a cosine table 206 to the I, and Q signal, to compensate for the phase noise remained in the I signal.

An I' signal having the phase noise thereof compensated is provided to an error determining part 207 and a slicing part 105, and a Q' signal is provided to the error determining part 207.

The error determining part 207 estimates the phase error, the gain error, and the DC offset from the I', and Q' signals, having the phase errors therein compensated, and provides the phase error to the phase loop filter 208, the DC offset to the DC offset loop filter 209, and the gain error to the gain loop filter 211.

The phase loop filter 208 multiplies a loop gain to a received estimated value of the phase noise, i.e., the phase error, accumulates multiplied values, and provides to a complex multiplier 205. That is, once the phase error passes the phase loop filter 208, the value becomes a sinusoidal value, approximately. Therefore, a value from the phase loop filter 208 can be used as a sinusoidal value. A cosine value can be obtained from a cosine table 206, by reading the cosine table 206 to pick up a cosine value corresponding to the sinusoidal value, which is provided to the complex multiplier 205.

The DC offset loop filter 209 multiplies a loop gain to the DC offset from the error determining part 207, accumulates the values, to generate a DC offset compensation signal, and provides to the adder 204 through the limiter 210.

The gain loop filter 211 multiplies a loop gain to the gain error from the error determining part 207, and accumulates the values, to generate a gain error compensation signal, and provides to the multiplier 201 through the limiter 212. For stability of the DC offset loop filter 209 and the gain loop filter 211, the limiters 210 and 212 limit the DC offset compensation signal from the DC offset loop filter 209, and the gain error compensation signal from the gain loop filter 211 to be within preset values, respectively.

In this instance, more accurate detection of the phase error is required for effective compensation of the phase noise.

SUMMARY OF THE INVENTION

Accordingly, the present invention is directed to device and method for tracking a phase error in a digital TV receiver that substantially obviates one or more of the problems due to limitations and disadvantages of the related art.

An object of the present invention is to provide device and method for tracking a phase error in a digital TV receiver, which can estimate a phase error, accurately.

Other object of the present invention is to provide device and method for tracking a phase error in a digital TV receiver, which can estimate a phase error more accurately by reducing or eliminating an influence of an estimated phase error in a proximity of Q=zero.

Additional features and advantages of the invention will be set forth in the description which follows, and in part will be apparent to those having ordinary skill in the art upon examination of the following or may be learned from practice of the invention. The objectives and other advantages of the invention will be realized and attained by the structure particularly pointed out in the written description and claims hereof as well as the appended drawings.

To achieve these objects and other advantages and in accordance with the purpose of the present invention, as embodied and broadly described herein, the device for tracking a phase error in a digital TV receiver includes an error determining part for subtracting the phase noise compensated I signal from I level reference signals of VSB signal, to obtain an error of the I signal, a basic phase error estimating part for multiplying a sign of the Q signal having a phase noise thereof compensated to the error of the I signal from the error determining part, to estimate a basic phase error, a phase error compensating part for determining a phase error compensating area, multiplying a preset constant 'α' to the basic phase error to provide a final phase error in the determined phase error compensating area, and providing the basic phase error as it is as the final phase error in other areas, and a phase noise compensating part for adjusting a gain of the estimated final phase error, making complex multiplication of a sine value and a cosine value proportional to the gain adjusted phase error value to the restored I signal and the estimated Q signal, to compensate for the phase error remained in the restored I signal and the estimated Q signal.

The constant 'α' multiplied at the phase error compensating part is equal to, or greater than '0', but smaller than '1' ($0 \leq \alpha < 1$).

The phase error compensating part determines a signal area as the phase error compensating area, in which an absolute value of the Q signal is smaller than a value obtained by multiplying a constant β to an absolute value of I signal ($|Q| < \beta * |I|$).

The phase error compensating part determines a signal area as the phase error compensating area, in which an absolute value of the Q signal is smaller than a constant γ ($|Q| < \gamma$).

In other aspect of the present invention, there is provided a method for tracking a phase error in a digital TV receiver including the steps of subtracting the phase noise compensated I signal from I level reference signals of VSB signal, to obtain an error of the I signal, multiplying a sign of the Q signal having a phase noise thereof compensated to the error of the I signal from the error determining part, to estimate a basic phase error, determining a phase error compensating area, multiplying a preset constant 'α' to the basic phase error to provide a final phase error in the determined phase error compensating area, and providing the basic phase error as it is as the final phase error in other areas, and adjusting a gain of the estimated final phase error, making complex multiplication of a sine value and a cosine value proportional to the gain adjusted phase error value to the restored I signal and the estimated Q signal, to compensate for the phase error remained in the restored I signal and the estimated Q signal.

It is to be understood that both the foregoing description and the following detailed description of the present invention are exemplary and explanatory and are intended to provide further explanation of the invention claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENT

Reference will now be made in detail to the preferred embodiments of the present invention, examples of which are illustrated in the accompanying drawings.

Figure 1:
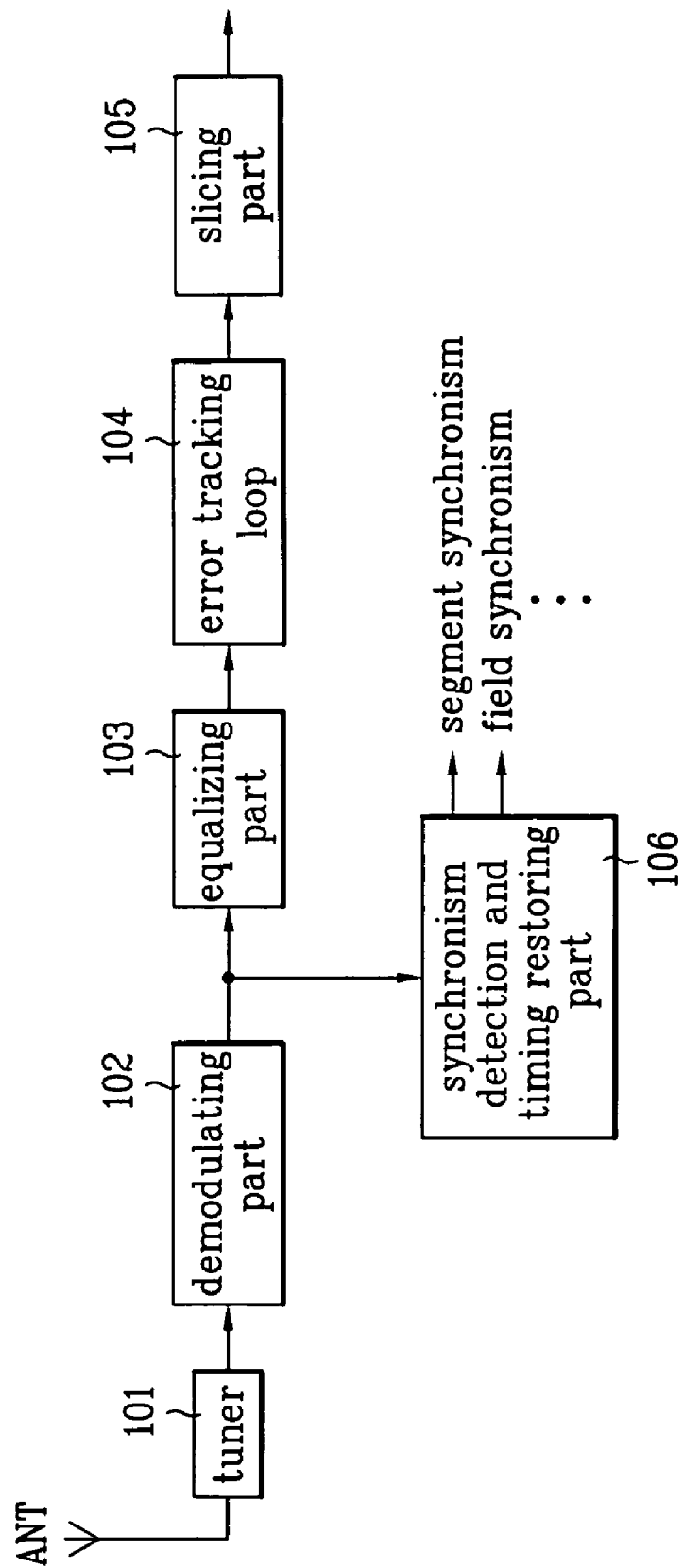
FIG. 1 illustrates a block diagram of a related art DTV receiver.
Figure 2:
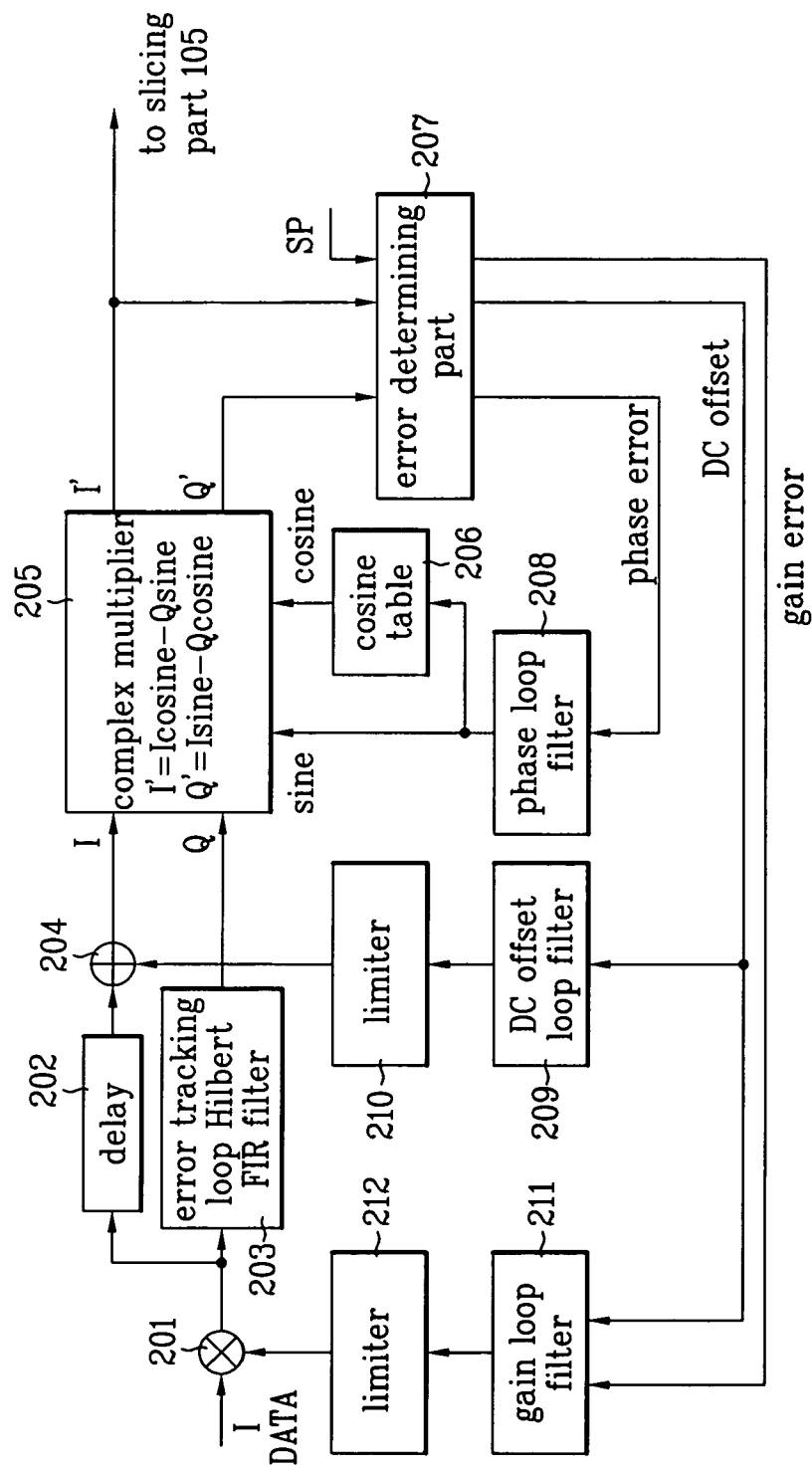
FIG. 2 illustrates a detailed block diagram of a related art error tracking loop.
Figure 3:
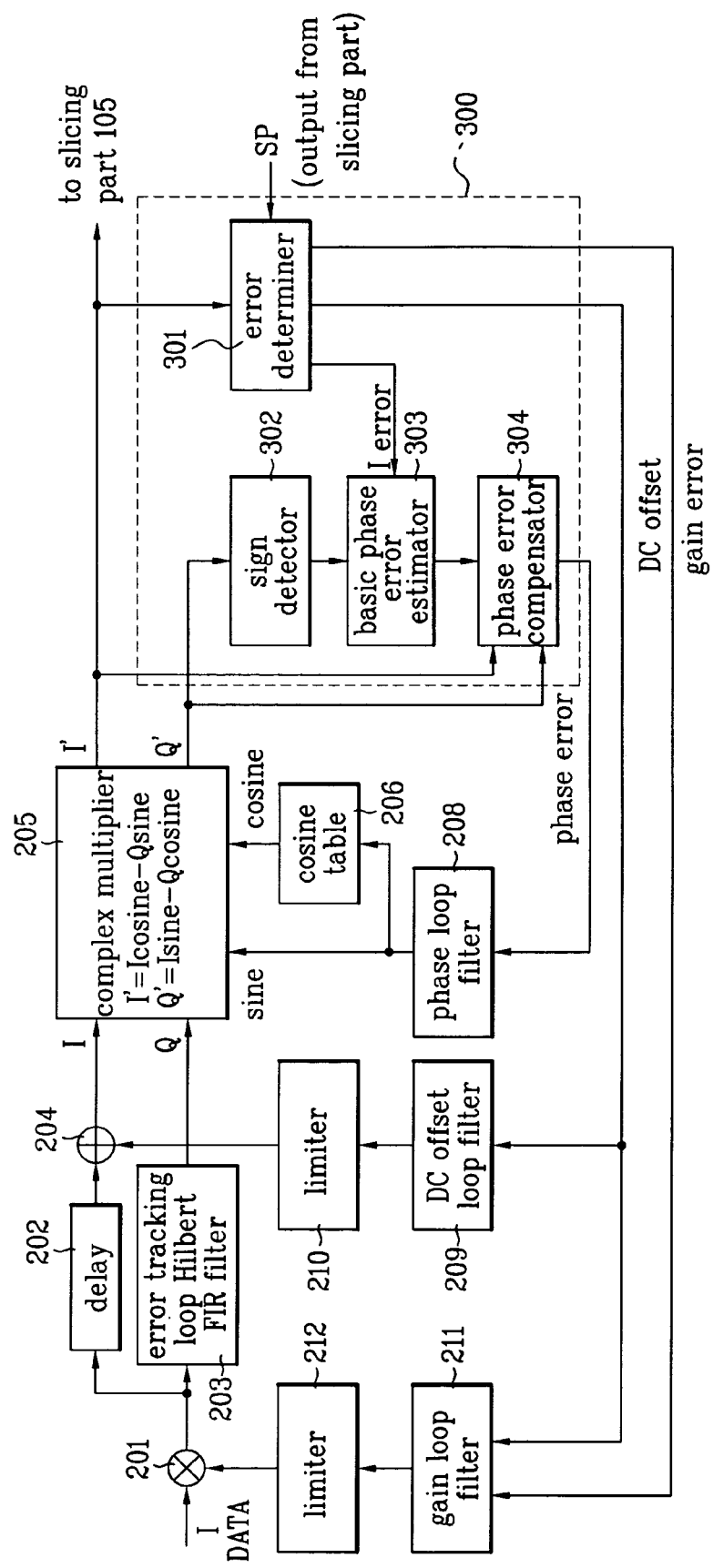
FIG. 3 illustrates a detailed block diagram of an error tracking loop in accordance with a preferred embodiment of the present invention.

FIG. 3 illustrates a detailed block diagram of an error tracking loop in accordance with a preferred embodiment of the present invention. Known arts can be applied to parts except a phase error estimating part 300 as they are, and the same reference symbols will be used for the same blocks shown in FIG. 2, of which detailed description will be omitted.

The phase error estimating part 300 includes an error determiner 301, for obtaining an I error, a gain error, a DC offset of an input signal from an I' signal from a complex multiplier 205, a sign detector 302 for detecting a sign of a Q signal from the complex multiplier 205, a basic phase error estimator 303 for multiplying the sign of the Q signal detected at the sign detector 302 to the I error value from the error determiner 301, to estimate a basic phase error, and a phase error compensator 304 for compensating for the basic phase error value estimated at the basic phase error estimator 303 only in a predetermined phase error compensation area, and providing to a phase loop filter 208.

In this instance, the DC offset determined at the error determiner 301 is provided to a DC offset loop filter 209, and the gain error is provided to a gain loop filter 211.

In the present invention having the foregoing system, the complex multiplier 205 makes complex multiplication of a sine wave and a cosine wave obtained through the phase loop filter 208 and a cosine table 206 to I, and Q signals, to compensate for a phase error remained in the I signal, and provides the I (I') signal to the error determiner 301 in the phase error estimating part 300, and the Q (Q') signal to the sign detector 302.

The error determiner 301 subtracts I (I') signal from reference signals of different I levels (=reference signals of different I levels–I signal), to obtain an error of the I signal, and provides to the basic phase error estimator 303. That is, the error determiner 301 slices the I' signal having the phase noise compensated for at a preset slicing level, to obtain a proximate symbol level value, and subtracts the proximate symbol level value SP from the I' signal, to generate an error of the I signal.

Moreover, the sign detector 302 detects, and provides a sign of the received Q signal (Q') to the basic phase error estimator 303. The sign detector 302 provides '1' if the received Q signal is equal to, or greater than '0', and '−1' if the received Q signal is smaller than '0'.

The basic phase error estimator 303 multiplies the sign of the Q signal to a received I signal error, to estimate, and provide a basic phase error to the phase error compensator 304.

The estimated basic phase error value can be expressed as the following equation (1).

Figure 5:
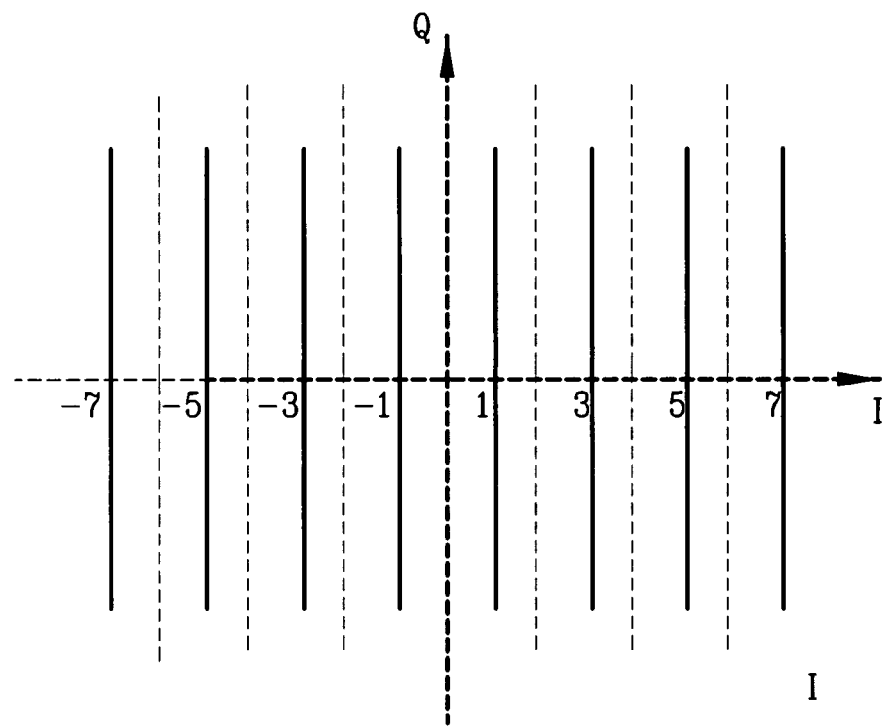
FIG. 5 illustrates a signal constellation at a related art DTV receiver of a VSB transmission system.

Estimated basic phase error value=*I* error of a received signal*sign of *Q* value FIG. 5 illustrates a signal constellation at a related art DTV receiver of a VSB transmission system. That is, since a transmission side of the VSB transmission system transmits real data I only, the I values only have level values as shown in FIG. 5 if there is no noise or distortion. Opposite to this, since there is no information on an imaginary data 'Q', the Q value has a random data. In FIG. 5, the vertical solid lines denote transmitted data, and the dashed lines denote boundaries of the levels.

Figure 6:
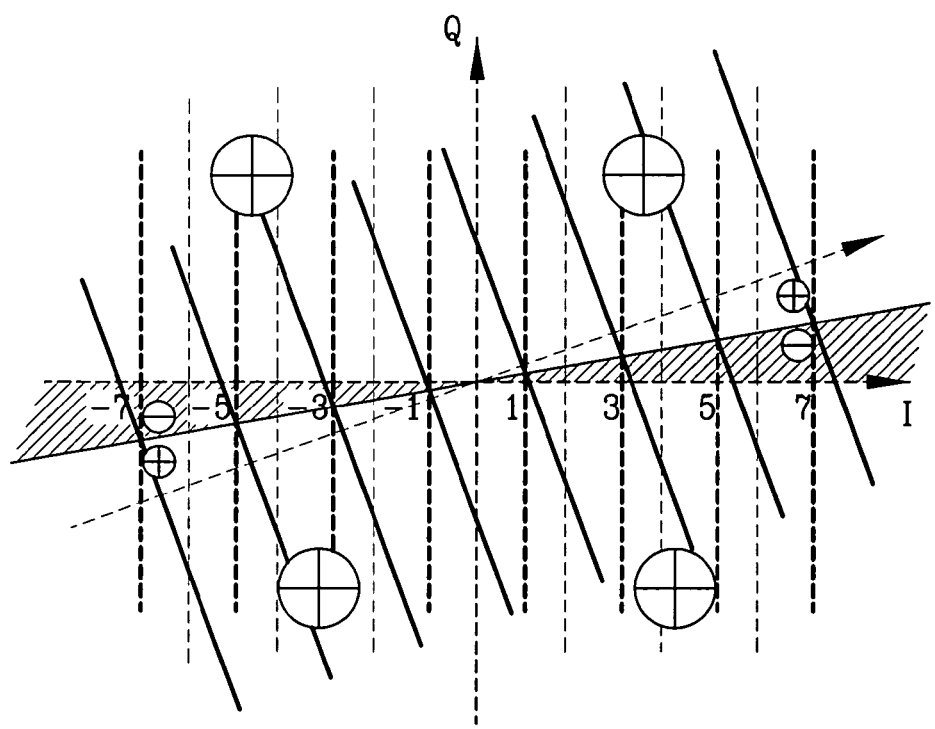
FIG. 6 illustrates a constellation when a positive phase error is occurred in the signal constellation of FIG. 5, and a sign of an estimated basic phase error value obtained in this time.

FIG. 6 illustrates a constellation when a positive phase error is occurred in the signal constellation of FIG. 5, and a sign of an estimated basic phase error value obtained in this time. In FIG. 6, the vertical dashed lines denote a position of a constellation before occurrence of the phase error, and thick solid lines denote a position of a constellation after occurrence of the phase error. Thin vertical lines denote reference values for levels of 'I'. That is, a value obtained by subtracting a rotated signal from a reference value, i.e., a value obtained by multiplying the sign of the Q value to the I error of the received signal, is the estimated basic phase error value.

If a positive error is occurred in FIG. 6, the sign of the estimated basic phase error value is positive. That is, since, when the I error of the received signal is positive, the sign of the Q value is also positive, and when the I error of the received signal is negative, the sign of the Q value is also negative, the sign of the estimated basic phase error value is positive. However, referring to the hatched parts in FIG. 6, it can be noted that the estimated basic phase error value has a negative sign, i.e., a wrongly estimated value is occurred, if the Q value is close to '0', and the greater the I value. That is, despite that, when the I error of the received signal is negative in the hatched parts, the sign of the Q value should be also negative, the sign of the Q value is positive actually, and despite that, when the I error of the received signal is positive in the hatched parts, the sign of the Q value should be also positive, the sign of the Q value is negative, actually.

Figure 7:
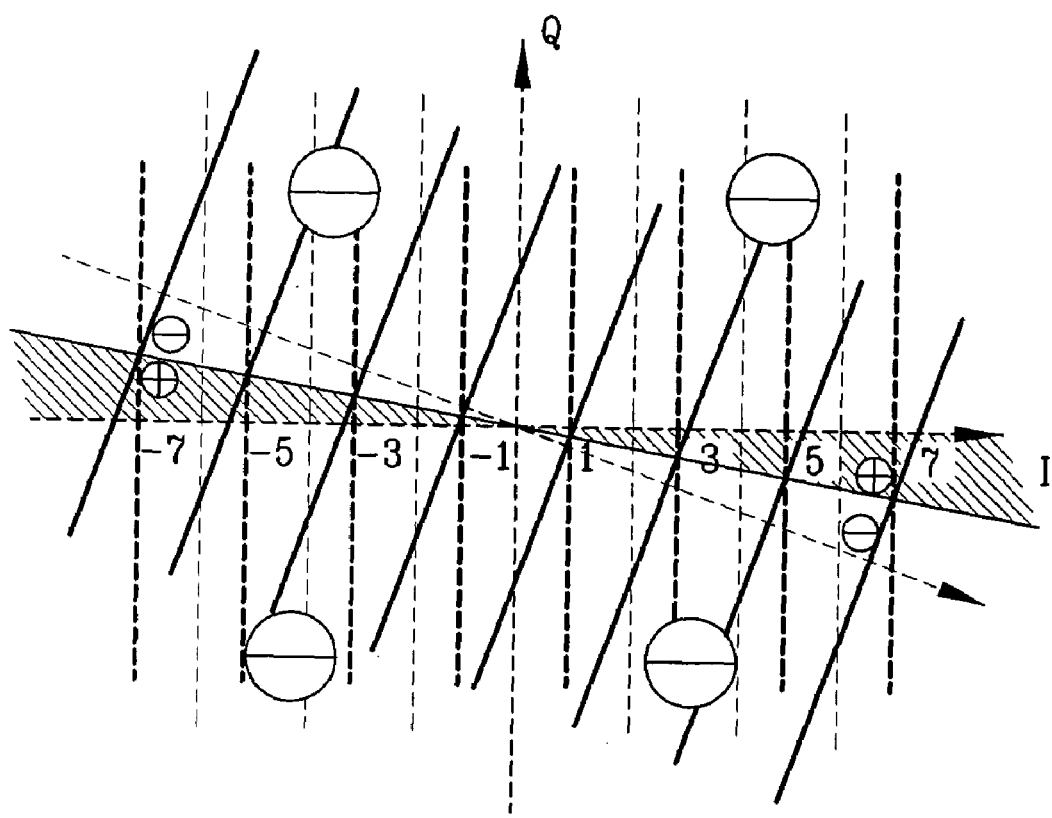
FIG. 7 illustrates a constellation when a negative phase error is occurred in the signal constellation of FIG. 5, and a sign of an estimated basic phase error value obtained in this time.

FIG. 7 illustrates a constellation when a negative phase error is occurred in the signal constellation of FIG. 5, and a sign of an estimated basic phase error value obtained in this time in the same way with FIG. 6. Referring to FIG. 7, when there is a negative phase error, the sign of the estimated basic phase error value is negative. However, the same with FIG. 6, it can be noted that an area having a positive sign, a wrongly estimated value, is occurred in hatched parts of FIG. 7, if the Q value is close to '0', and the greater the I value. Alikely, despite that, when the I error of the received signal is negative in the hatched parts, the sign of the Q value should be positive, the sign of the Q value is negative actually, and despite that, when the I error of the received signal is positive in the hatched parts, the sign of the Q value should be negative, the sign of the Q value is positive, actually.

Thus, as shown in FIGS. 6 and 7, if the phase error is occurred, the Q value close to '0', i.e., the hatched parts are involved in sign shifting as the phase turns. That is, as shown in FIGS. 6 and 7, it can be known that the sign of the estimated basic phase error value is shifted to a sign opposite to a sign of a normally estimated basic phase error value in the hatched parts as the sign of the Q value is shifted. For an example, if the phase error is occurred on a '+' side, even though it is one that is normally estimated if the phase error value also has a '+' value, if the phase error value is '−', it is an estimation wrongly made.

This wrong phase error estimation with an opposite sign may cause performance degradation of the phase error tracking. The phase error compensator 304 in FIG. 3 compensates for the estimated phase error value in an area the sign is shifted. That is, the present invention suggests a method for eliminating or reducing an influence of a wrongly estimated basic phase error when the Q value is close to '0'.

For an example, the phase error compensator 304 multiplies a preset constant 'α' to the estimated basic phase error value when the Q value is close to '0', to reduce or eliminate the influence of the basic phase error value estimated in a relevant area. The constant 'α' is set to be a value equal to, or greater thank '0', but smaller than unity ($0 \leq \alpha < 1$). That is, the closer the constant to '0', the influence of the phase error in the area becomes the smaller.

Figure 4:
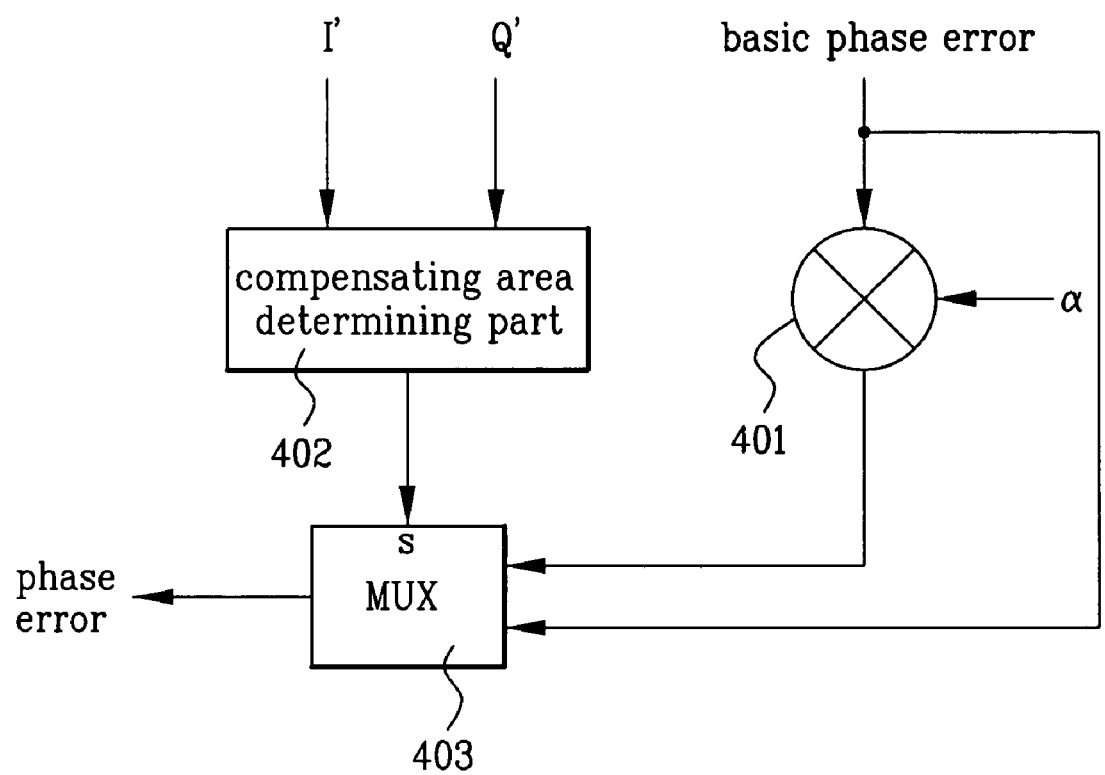
FIG. 4 illustrates a detailed block diagram of an example of the phase error compensator in FIG. 3.

FIG. 4 illustrates a detailed block diagram of an example of the phase error compensator 304 in FIG. 3, including a multiplier 401 for multiplying a preset constant 'α' to the basic phase error value, to compensate for the estimated basic phase error, a compensating area determining part 402 for determining an area the basic phase error therein is to be compensated for, and a multiplexer 403 for selecting, and forwarding the phase error compensated at the multiplier 401 in a compensation area having the compensating area determining part 402 determined, and selecting and forwarding a basic phase error from the basic phase error estimator 303 in other areas.

That is, the multiplier 401 multiplies a preset constant 'α' to the basic phase error value from the basic phase error estimator 303, to reduce or eliminate an influence of the estimated basic phase error value in the phase compensating area.

Figure 8:
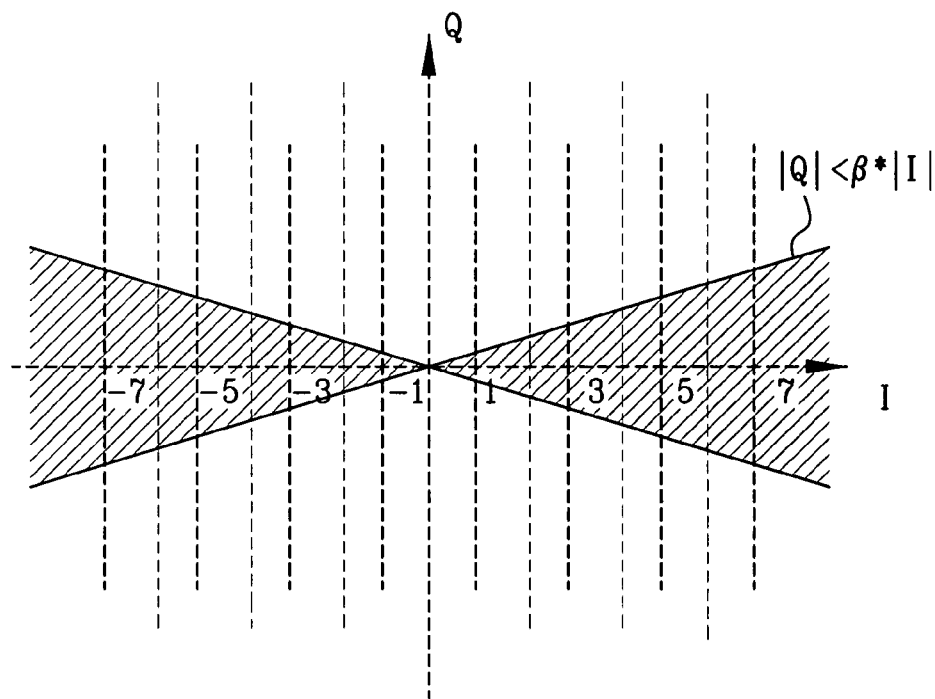
FIG. 8 illustrates an example of determining a phase error compensating area in proportion to an I value at the compensating area determining part in FIG. 4.
Figure 9:
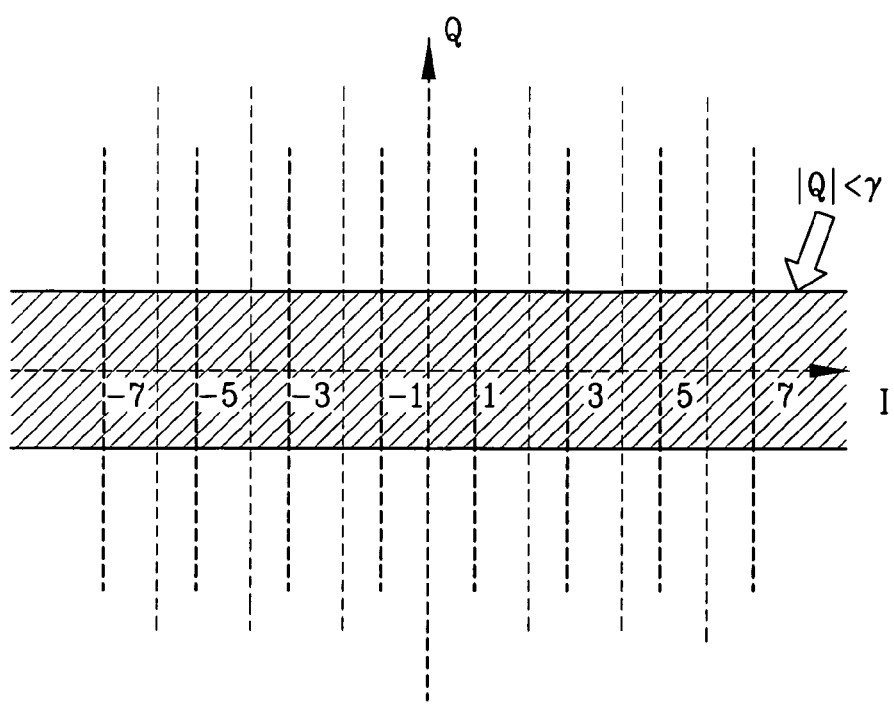
FIG. 9 illustrates an example of determining a phase error compensating area only by using a Q value at the compensating area determining part in FIG. 4.

There can be different methods for determining an area for compensating the phase error at the compensating area determining part 402. FIGS. 8 and 9 illustrate embodiments.

FIG. 8 illustrates an example of setting a phase error compensating area in proportion to an I value, and FIG. 9 illustrates an example of setting a phase error compensating area only by using a Q value.

Referring to FIG. 8, a Q signal area is set, in which an absolute value of the Q signal is smaller than a value obtained by multiplying a constant β to an absolute value of I signal $|Q|<\beta*|I|$. As shown in FIGS. 6 and 7, this is because the area in which the basic phase error value is estimated wrongly becomes the larger as the I signal is the greater.

Referring to FIG. 9, the Q signal area having an absolute value of Q smaller than a constant 'γ' $|Q|<\gamma$ is set are the phase error compensating area, simply. Though, because a fact that the wrongly estimated area becomes the larger as the I value becomes larger is disregarded, this method may be more or less inaccurate than a method in FIG. 8, this method has an advantage in that a setting method becomes easy.

Accordingly, when the multiplexer 403 selects, and forwards the phase error compensated at the multiplier 401 in the compensating area determined at the compensating area determining part 402, and selects, and forwards the basic phase error from the basic phase error estimator 303 in other areas, the influence of the phase error value estimated in the phase compensating area determined as above can be reduced or eliminated.

FIG. 4 illustrates an embodiment of the phase error compensator 304, of which system may vary with designers. That is, in FIG. 4, the preset constant α is multiplied to the basic phase error without any condition, and the multiplied phase error is selected only in the determined compensating area, and the basic phase error is selected in other areas. However, as other embodiment, the preset constant α may be multiplied to the basic phase error only in the area determined at the compensating area determining part, and the basic phase error may be bypassed in other areas.

Thus, since the phase error compensator 304 is designed such that the phase error having the preset constant α multiplied thereto is forwarded in the determined phase compensating area, and the basic phase error is forwarded in other areas, the phase error compensator 304 has wider and a variety of applications, and the application is not limited to the one shown in above.

Figure 10:
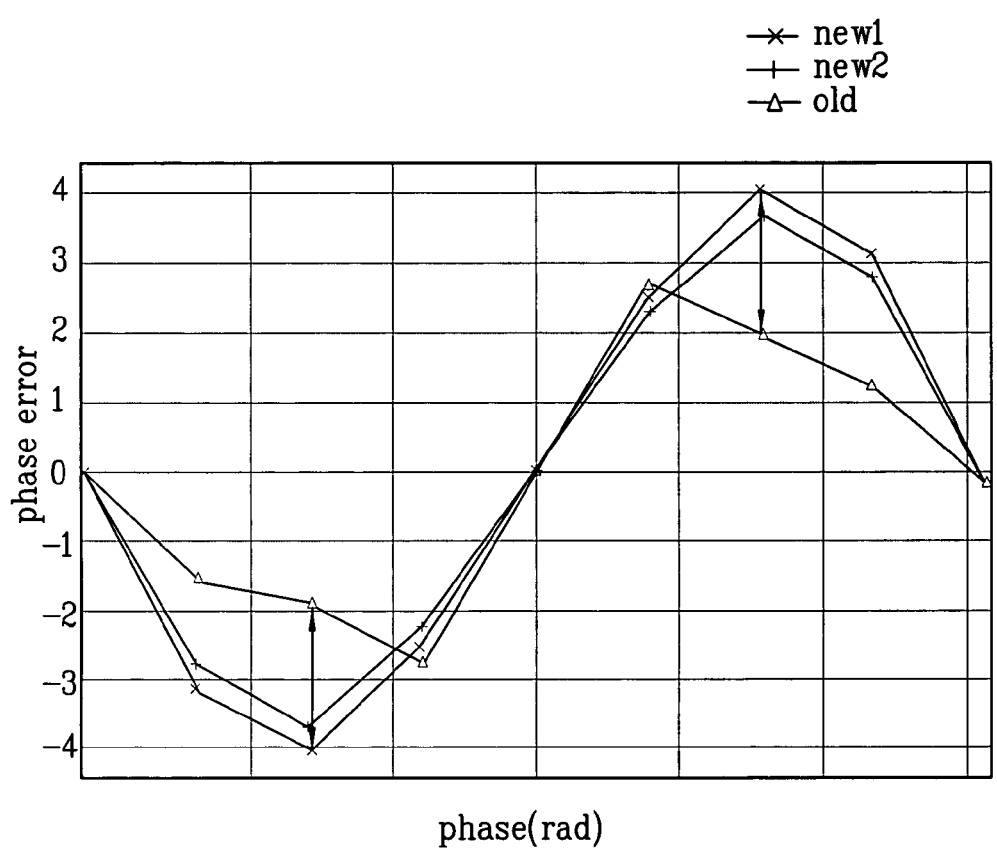
FIG. 10 illustrates a graph showing averages of phase errors obtained by applying the related art and the present invention versus a phase.

FIG. 10 illustrates a graph showing an average (old) of phase errors estimated at a related art error tracking loop in FIG. 2, an average (new1) of basic phase errors estimated in the basic phase error estimating part 303 of the present invention, and an average (new2) of phase errors compensated at the phase error compensator 304 versus a phase.

Figure 11:
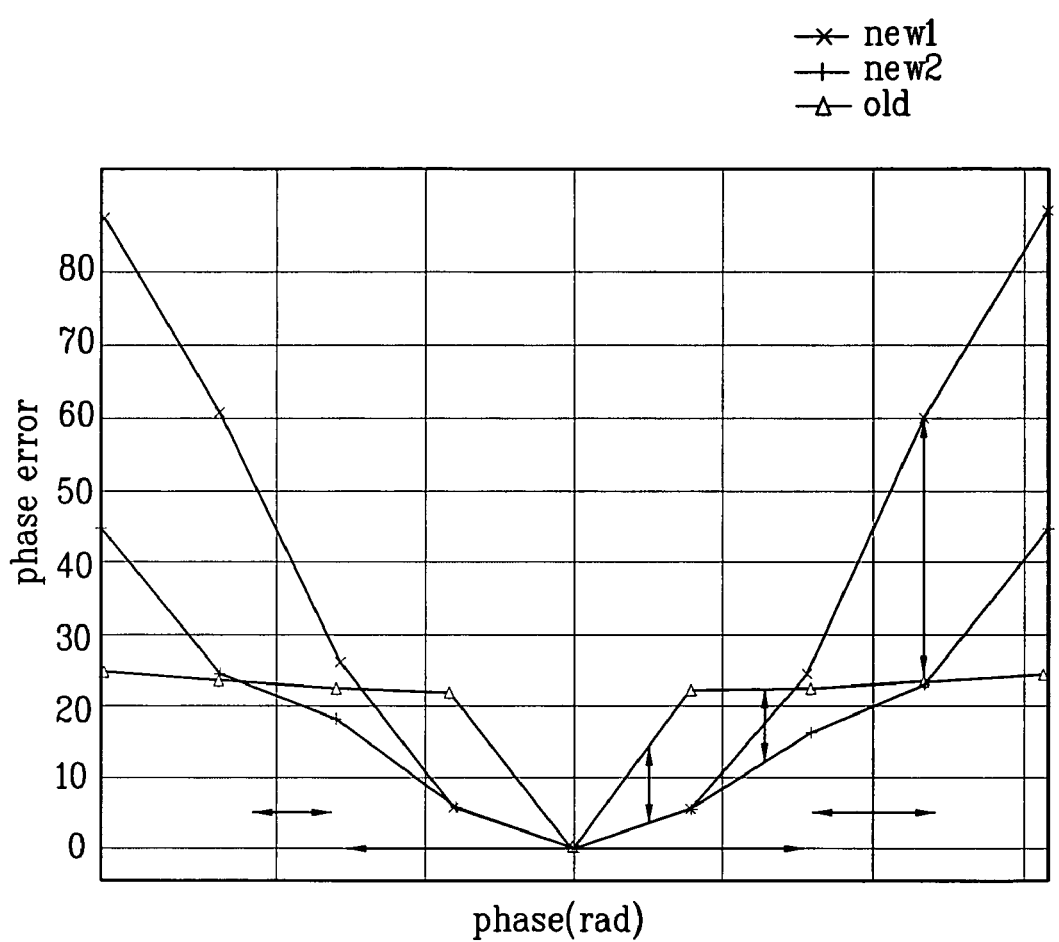
FIG. 11 illustrates distributions of estimated phase error values obtained by the different methods in FIG. 10.

FIG. 11 illustrates scatters of estimated phase error values obtained by the different methods in FIG. 10. Referring to FIG. 11, the average of the estimated phase errors is the more favorable as the scatter is the smaller while the average has a fixed gain (an estimated phase error=a constant*a given phase error) with respect to given phase errors from −180° to 180°.

Referring to FIGS. 10 and 11, the related art method shows an average estimated value decreased continuously after approx. 0.8 radian (about 45°) while the scatter increases continuously until about 45° quickly, where the scatter is almost constant. Since the error tracking loop is positioned after the equalizer in the DTV receiver of VSB type, the error tracking loop has about 90° of a phase noise range. Therefore, it is required that the error tracking loop has a good performance for phase errors within 90° (1.57 radian). The related art phase error estimation described before shows an average value at 45° and over which is not accurate and has a great scattering, the related art error tracking loop can not provide a good performance. Opposite to this, a new method represented with 'new1' shows a good error estimation characteristic, with an almost constant average gain, a good estimated characteristic up to 90°, and scattering smaller than related art method, except that the estimated error average at 90° and over is high, and greater scattering. However, the 'new2' shows a good performance within an effective phase range. The 'new2' represents a method for correcting a wrongly estimated estimation error suggested with reference to FIG. 3. In FIG. 2, the 'new2' shows the same estimated error average with the 'new1' except that the 'new2' has a gain little smaller than the 'new 1'. In the new2 scattering graph in FIG. 11, scattering of new2 at 45° and over shows substantially better scattering than new1, and has a better performance than a scattering of the related art up to 126° (2.2 radian), and a good estimation error average characteristic.

As has been described, device and method for tracking a phase error in a digital TV receiver of the present invention can estimate a phase error more accurately, to make a fast convergence at a phase error estimating device, and have an improved phase tracking performance, by multiplying a sign of a Q signal to an I error of a received signal, to estimate a basic phase error, and eliminating or reducing an influence of the estimated phase error value in a preset phase compensating area, i.e., when a Q value is close to '0'. Moreover, a size of jitter occurred in a phase tracking can be reduced.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A device for tracking a phase error in a digital TV receiver, in which an I signal is restored from a signal transmitted in VSB modulation system, a Q signal is estimated from the restored I signal, a phase noise is tracked from the restored I signal and the estimated Q signal, and the phase noise is compensated, comprising:

an error determining part for subtracting the phase noise compensated I signal from I level reference signals of VSB signal, to obtain an error of the I signal;

a basic phase error estimating part for multiplying a sign of the Q signal having a phase noise thereof compensated to the error of the I signal from the error determining part, to estimate a basic phase error;

a phase error compensating part for determining a phase error compensating area, multiplying a preset constant 'α' to the basic phase error to provide a final phase error in the determined phase error compensating area, and providing the basic phase error as it is as the final phase error in other areas; and a phase noise compensating part for adjusting a gain of the estimated final phase error, making complex multiplication of a sine value and a cosine value proportional to the gain adjusted phase error value to the restored I signal and the estimated Q signal, to compensate for the phase error remained in the restored I signal and the estimated Q signal.

2. The device as claimed in claim 1, wherein the I level reference signals of VSB signal are symbol level values obtained by slicing the I signal having the phase noise thereof compensated at preset slicing levels.

3. The device as claimed in claim 1, further comprising a sign detecting part for detecting a sign of the Q signal having the phase noise thereof compensated, and providing to the basic phase error estimating part.

4. The device as claimed in claim 1, wherein the constant 'α' multiplied at the phase error compensating part is equal to, or greater than '0', but smaller than '1' ($0 \leq \alpha < 1$).

5. The device as claimed in claim 1, wherein the phase error compensating part determines a signal area as the phase error compensating area, in which an absolute value of the Q signal is smaller than a value obtained by multiplying a constant β to an absolute value of I signal ($|Q|<\beta*|I|$).

6. The device as claimed in claim 1, wherein the phase error compensating part determines a signal area as the phase error compensating area, in which an absolute value of the Q signal is smaller than a constant γ($|Q|<\gamma$).

7. The device as claimed in claim 1, wherein the phase error compensating part includes;

a multiplier for multiplying a preset constant 'α' to the basic phase error value from the basic phase error estimating part, to compensate for the basic phase error, a compensating area determining part for determining a phase error compensating area the basic phase error therein is to be compensated, and a selecting part for selecting, and forwarding the phase error from the multiplier in the phase compensation area having the compensating area determining part determined, and selecting and forwarding a basic phase error from the basic phase error estimating part in other areas.

8. The device as claimed in claim 7, wherein the compensating area determining part determines a signal area as the phase error compensating area, in which an absolute value of the Q signal having the phase noise thereof compensated is smaller than a value obtained by multiplying a constant β to an absolute value of I signal ($|Q|<\beta*|I|$).

9. The device as claimed in claim 7, wherein the compensating area determining part determines a signal area as the phase error compensating area, in which an absolute value of the Q signal having the phase noise thereof compensated is smaller than a constant γ($|Q|<\gamma$).

10. A method for tracking a phase error in a digital TV receiver, in which an I signal is restored from a signal transmitted in VSB modulation system, a Q signal is estimated from the restored I signal, a phase noise is tracked from the restored I signal and the estimated Q signal, and the phase noise is compensated, comprising the steps of:

(a) subtracting the phase noise compensated I signal from I level reference signals of VSB signal, to obtain an error of the I signal;

(b) multiplying a sign of the Q signal having a phase noise thereof compensated to the error of the I signal from the error determining part, to estimate a basic phase error;

(c) determining a phase error compensating area, multiplying a preset constant 'α' to the basic phase error to provide a final phase error in the determined phase error compensating area, and providing the basic phase error as it is as the final phase error in other areas; and (d) adjusting a gain of the estimated final phase error, making complex multiplication of a sine value and a cosine value proportional to the gain adjusted phase error value to the restored I signal and the estimated Q signal, to compensate for the phase error remained in the restored I signal and the estimated Q signal.

11. The method as claimed in claim 10, wherein the I level reference signals of VSB signal are symbol level values obtained by slicing the I signal having the phase noise thereof compensated at preset slicing levels.

12. The method as claimed in claim 10, further comprising the step of detecting a sign of the Q signal having the phase noise thereof compensated before the step (b).

13. The method as claimed in claim 10, wherein the step (c) includes the step of determining that the constant 'α' is equal to, or greater than '0', but smaller than '1' ($0 \leq \alpha < 1$).

14. The method as claimed in claim 10, wherein the step (c) includes the step of determining a signal area as the phase error compensating area, in which an absolute value of the Q signal is smaller than a value obtained by multiplying a constant β to an absolute value of I signal ($|Q|<\beta*|I|$).

15. The method as claimed in claim 10, wherein the step (c) includes the step of determining a signal area as the phase error compensating area, in which an absolute value of the Q signal is smaller than a constant γ($|Q|<\gamma$).

* * * * *